United States Patent
Luo et al.

(10) Patent No.: US 10,233,375 B1
(45) Date of Patent: Mar. 19, 2019

(54) DRILLING FLUID FOR INHIBITING SURFACE HYDRATION OF CLAY AND PREPARATION METHOD THEREOF

(71) Applicant: Southwest Petroleum University, Chengdu (CN)

(72) Inventors: Pingya Luo, Chengdu (CN); Yang Bai, Chengdu (CN); Gang Xie, Chengdu (CN)

(73) Assignee: Southwest Petroleum University (CN)

( * ) Notice: Subject to any disclaimer, the term of this patent is extended or adjusted under 35 U.S.C. 154(b) by 0 days.

(21) Appl. No.: 15/952,880

(22) Filed: Apr. 13, 2018

Related U.S. Application Data

(63) Continuation of application No. PCT/CN2018/075984, filed on Feb. 9, 2018.

(30) Foreign Application Priority Data

Feb. 7, 2018 (CN) .......................... 2018 1 0123946

(51) Int. Cl.
| | |
|---|---|
| *C09K 8/28* | (2006.01) |
| *C09K 8/12* | (2006.01) |
| *C09K 8/584* | (2006.01) |
| *C09K 8/74* | (2006.01) |
| *C09K 8/24* | (2006.01) |
| *C09K 8/16* | (2006.01) |
| *C09K 8/20* | (2006.01) |

(52) U.S. Cl.
CPC ................ *C09K 8/24* (2013.01); *C09K 8/16* (2013.01); *C09K 8/203* (2013.01); *C09K 8/206* (2013.01); *C09K 2208/12* (2013.01)

(58) Field of Classification Search
None
See application file for complete search history.

(56) References Cited

U.S. PATENT DOCUMENTS

| | | | | |
|---|---|---|---|---|
| 2006/0254826 A1* | 11/2006 | Alberthy | ................ | C09K 8/03 175/72 |
| 2007/0129258 A1* | 6/2007 | Patel | ...................... | C09K 8/24 507/129 |
| 2013/0126243 A1* | 5/2013 | Smith | ..................... | C09K 8/05 175/65 |
| 2015/0027699 A1* | 1/2015 | Loiseau | .................. | C09K 8/92 166/278 |

FOREIGN PATENT DOCUMENTS

CN 107446559 A * 12/2017

OTHER PUBLICATIONS

English translation of CN107446559 A (Year: 2017).*

* cited by examiner

*Primary Examiner* — Jeffrey D Washville
(74) *Attorney, Agent, or Firm* — Calfee, Halter & Griswold LLP

(57) ABSTRACT

The present invention relates to the field of drilling fluids, and discloses a drilling fluid that can inhibit surface hydration of clay and a preparation method of the drilling fluid. The drilling fluid contains water, bentonite, an intercalation inhibitor, a tackifier, a flow pattern regulator, a filtrate reducer, a lubricant, and a weighting agent, wherein, based on 100 parts by weight of water, the content of the bentonite is 2-9 parts by weight, the content of the intercalation inhibitor is 0.3-4 parts by weight, the content of the tackifier is 1-10 parts by weight, the content of the flow pattern regulator is 0.8-7 parts by weight, the content of the filtrate reducer is 1-8 parts by weight, the content of the lubricant is 0.5-4 parts by weight, and the content of the weighting agent is 12-60 parts by weight; the intercalation inhibitor prepared in the present invention can effectively control the degree of surface hydration of clay and thereby greatly improve the inhibition performance of the drilling fluid system by virtue of adsorption, intercalation, and ion exchange effects, etc. attained by the adsorptive groups that have specific functions in the intercalation inhibitor, when the intercalation inhibitor is intercalated in a form of a single spread layer between grain layers of clay minerals.

6 Claims, No Drawings

DRILLING FLUID FOR INHIBITING SURFACE HYDRATION OF CLAY AND PREPARATION METHOD THEREOF

CROSS-REFERENCE TO RELATED APPLICATIONS

This application is a continuation of International Application No. PCT/CN2018/075984, filed on Feb. 9, 2018, which claims priority to and benefits of Chinese Patent Application Serial No. 201810123946.5, filed with the State Intellectual Property Office of P. R. China on Feb. 7, 2018, the entire contents of which are incorporated herein by reference.

FIELD OF THE INVENTION

The present invention relates to the field of drilling fluids, in particular to a drilling fluid that can inhibit surface hydration of clay and a preparation method of the drilling fluid.

BACKGROUND OF THE INVENTION

Oil-based drilling fluids are widely applied owing to advantages including high well wall stability, stable drilling fluid properties, and oil reservoir protection, because they can fully inhibit hydration of clay minerals in strata. However, oil-based drilling fluids have shortcomings, for example, they may cause severe environmental pollution that is difficult to handle, and have high cost, etc. Hence, presently, developing water-based drilling fluids that attain effects equivalent to those of oil-based drilling fluids as substitutes for oil-based drilling fluids is a trend in the technological development of drilling fluids, especially in shale gas exploitation. Shale strata have a high content of clay minerals, and horizontal shale gas wells have a long horizontal section, resulting in increased time of contact between the drilling fluid and the strata, more severe shale hydration, and more severe well wall instability. To realize the substitution, first of all, water-based drilling fluids must be capable of fully inhibit osmotic hydration and surface hydration of clay minerals just like oil-based drilling fluids. With the present theory and techniques of water-based drilling fluids, only osmotic hydration of clay minerals can be inhibited effectively, but surface hydration of clay minerals can't be inhibited satisfactorily.

Therefore, it is urgent task to make research on and develop a theory and methods for water-based drilling fluids to inhibit surface hydration of clay minerals, in order to create an innovative water-based drilling fluid system that has inhibition capability comparable to that of oil-based drilling fluid systems, has little or no harm to the environment, and can be produced at a low cost, so as to substitute oil-based drilling fluids.

SUMMARY OF THE INVENTION

To overcome the above-mentioned drawbacks in the prior art, in view of the problem that only osmotic hydration of clay minerals can be inhibited effectively with the present theory and techniques of water-based drilling fluids but surface hydration of clay minerals can't be inhibited satisfactorily, the present invention provides a drilling fluid that can inhibit surface hydration of clay and a preparation method of the drilling fluid. The drilling fluid is highly capable of inhibiting surface hydration of clay.

To attain the object described above, in one aspect, the present invention provides a drilling fluid for inhibiting surface hydration of clay. The drilling fluid contains water, bentonite, an intercalation inhibitor, a tackifier, a flow pattern regulator, a filtrate reducer, a lubricant, and a weighting agent, wherein, based on 100 parts by weight of water, the content of the bentonite is 2-9 parts by weight, the content of the intercalation inhibitor is 0.3-4 parts by weight, the content of the tackifier is 1-10 parts by weight, the content of the flow pattern regulator is 0.8-7 parts by weight, the content of the filtrate reducer is 1-8 parts by weight, the content of the lubricant is 0.5-4 parts by weight, and the content of the weighting agent is 12-60 parts by weight.

In another aspect, the present invention provides a method for preparing a drilling fluid that inhibits surface hydration of clay, which comprises the following steps:
(1) prehydrating bentonite;
(2) mixing the prehydrated bentonite obtained in the step (1) with an intercalation inhibitor;
(3) mixing the mixture obtained in the step (2) with a tackifier, a flow pattern regulator, a filtrate reducer, a lubricant, and a weighting agent.

With the technical scheme described above, an intercalation inhibitor that has strong inhibition capability is prepared under a principle of "inhibiting surface hydration of clay minerals by intercalation and adsorption", the adsorptive groups in the intercalation inhibitor are intercalated in a form of a single spread layer between grain layers of the clay minerals by virtue of adsorption, intercalation, and ion exchange effects, etc., and thereby effective control the degree of surface hydration of clay. Thus, the inhibition performance of the drilling fluid system is greatly improved.

DETAILED DESCRIPTION OF THE EMBODIMENTS

Hereunder some embodiments of the present invention will be detailed. It should be understood that the embodiments described here are only provided to describe and explain the present invention, but shall not be deemed as constituting any limitation to the present invention.

In one aspect, the present invention provides a drilling fluid for inhibiting surface hydration of clay. The drilling fluid contains water, bentonite, an intercalation inhibitor, a tackifier, a flow pattern regulator, a filtrate reducer, a lubricant, and a weighting agent, wherein, based on 100 parts by weight of water, the content of the bentonite may be 2-9 parts by weight, the content of the intercalation inhibitor may be 0.3-4 parts by weight, the content of the tackifier may be 1-10 parts by weight, the content of the flow pattern regulator may be 0.8-7 parts by weight, the content of the filtrate reducer may be 1-8 parts by weight, the content of the lubricant may be 0.5-4 parts by weight, and the content of the weighting agent may be 12-60 parts by weight.

In the present invention, to inhibit surface hydration of clay minerals better, preferably, based on 100 parts by weight of water, the content of the bentonite is 3-5 parts by weight, the content of the intercalation inhibitor is 0.8-1.2 parts by weight, the content of the tackifier is 4-6 parts by weight, the content of the flow pattern regulator is 3-5 parts by weight, the content of the filtrate reducer is 3-5 parts by weight, the content of the lubricant is 1.2-1.6 parts by weight, and the content of the weighting agent is 50-54 parts by weight.

In the drilling fluid according to the present invention, the bentonite may be Xinjiang Xiazijie bentonite from Xinjiang Nonmetallic Minerals Xiazijie Bentonite Co., Ltd.

The tackifier may be one or more of xanthan gum, asbestos fiber and/or hydroxyethyl cellulose; to inhibit surface hydration of clay minerals better, preferably, the tackifier is xanthan gum; in the present invention, the xanthan gum may be xanthan gum XC from Henan Yongjia Chemical Products Co., Ltd.; the asbestos fiber may be asbestos fiber SM-1 from Lingshou Pengbo Minerals Processing Plant; the hydroxyethyl cellulose may be hydroxyethyl cellulose HEC from Feicheng Yutian Chemicals Co., Ltd.

The flow pattern regulator may be one or more of chromium-free sulfonated lignite, acrylamide and/or sodium acrylate; to inhibit surface hydration of clay minerals better, preferably, the flow pattern regulator is chromium-free sulfonated lignite; in the present invention, the chromium-free sulfonated lignite may be chromium-sulfonated lignite M-SMC from Chengdu Chuanfeng Chemicals Co., Ltd.; the acrylamide may be acrylamide ACM from Chengdu Kelong Chemical Reagent Plant; the sodium acrylate may be sodium acrylate SA from Chengdu Kelong Chemical Reagent Plant.

The filtrate reducer may be one or more of sulfomethylated phenolic resin, lignite resin and/or carboxymethyl starch; to inhibit surface hydration of clay minerals better, preferably, the filtrate reducer is sulfomethylated phenolic resin; in the present invention, the sulfomethylated phenolic resin may be sulfomethylated phenolic resin SMP-2 from Hebei Yanxing Chemicals Co., Ltd.; the lignite resin may be lignite resin SPNH from Chengdu Chuanfeng Chemicals Co., Ltd.; the carboxymethyl starch may be carboxymethyl starch CMS from Hebei Yanxing Chemicals Co., Ltd.

The lubricant may be one or more of graphite powder, white oil and/or toughened glass beads; to inhibit surface hydration of clay minerals better, preferably, the lubricant is graphite powder; in the present invention, the graphite powder may be graphite powder SG-12 from Qingdao Jintan Graphite Lubrication Technology Co., Ltd.; the white oil may be white oil BY-1 from Chengdu Kelong Chemical Reagent Plant; the toughened glass beads may be toughened glass beads BL-2 from Yuyao Mingzhu Glass Bead Plant.

The weighting agent may be barite; in the present invention, the barite may be barite BS-1 from Lingshou Yaoxin Minerals Processing Plant.

In the drilling fluid according to the present invention, the method for preparing the intercalation inhibitor may comprise the following steps:
(1) controlling ethanol amine and concentrated sulfuric acid to have an esterification reaction in the presence of an organic solvent;
(2) dissolving the product obtained in the step (1) in alkali to have a cyclization reaction;
(3) controlling the aziridine obtained in the step (2) to have a reflux reaction with a polyamine compound.

Wherein, in the step (1), the organic solvent may be one or more of methanol, ethanol, propanol, and water; preferably, the organic solvent is ethanol; more preferably, the organic solvent is 20-70 wt % ethanol; for example, ethanol and water may be mixed at the following mix ratio: in relation to 100 parts by weight of water, the dose of the ethanol is 20-70 parts by weight; moreover, there is not particular restriction on the water; preferably, the water is deionized water.

In the preparation method, the conditions of the esterification reaction may include: temperature: −40° C.~20° C.; preferably −30° C.~10° C.

In the preparation method, in relation to 100 ml organic solvent, the dose of the ethanol amine may be 0.1-0.5 mol; preferably is 0.2-0.4 mol.

In the preparation method, in view that the speed of reaction between inorganic strong acid and alcohol is very high, to control the reaction speed better and enable the prepared intercalation inhibitor to control the degree of surface hydration of clay more effectively, preferably, in the step (1), the concentrated sulfuric acid is added by dropwise adding into the organic solution of ethanol amine, wherein, the dropwise adding rate may be 10-25 ml/min., preferably is 12-20 ml/min., more preferably is 15 ml/min.; more preferably, the esterification reaction is executed under a stirring condition, wherein, the stirring speed may be 400-2,000 rpm, preferably is 1,000-1,500 rpm, more preferably is 1,200 rpm.

The preparation method further comprises executing reduced pressure distillation to remove the organic solvent after the esterification reaction, so as to obtain a product β-aminoethyl sulfate of esterification reaction.

Wherein, in the step (2), the conditions of the cyclization reaction may include: temperature: 100-120° C., preferably 100-110° C., more preferably 105° C.

In the preparation method, in relation to 100 ml organic solvent, the dose of the alkali may be 30-80 ml; preferably is 40-60 ml; more preferably is 50 ml; wherein, the mass concentration of the alkali may be 20-40%; preferably is 25-35%.

In the preparation method, to dissolve the product β-aminoethyl sulfate obtained in the step (1) in the alkali better, the product β-aminoethyl sulfate may be dissolved in the alkali under a heating condition, wherein, the alkali may be one or more of sodium hydroxide, potassium hydroxide, calcium hydroxide, and ammonia ($NH_3.H_2O$); preferably is sodium hydroxide.

The preparation method further comprises executing atmospheric distillation after the cyclization reaction, adding a solid desiccant into the distillate for stratification, and collecting the organic phase, so as to obtain aziridine; wherein, the solid desiccant may be one or more of soda lime, solid NaOH, calcium oxide, solid phosphorus pentoxide, calcium chloride anhydrite, and anhydrous cupric sulfate.

Wherein, in the step (3), the method further comprises executing reduced pressure distillation after the reflux reaction; the conditions of the reduced pressure distillation may include: pressure: 0.01-0.07 MPa.

In the preparation method, the polyamine compound may be polyethylene polyamine and/or alkylamine; preferably, the polyethylene polyamine is one or more of diethylene triamine, triethylene tetramine, tetraethylene pentamine, and pentaethylene hexamine; the alkylamine is one or more of ethylene diamine, propylene diamine, butane diamine, pentamethylene diamine, nonamethylene diamine, and decamethylene diamine.

In the preparation method, the conditions of the reflux reaction may include: Temperature: 80-150° C., time: 3-12 h; preferably, temperature: 90-120° C., time: 4-10 h; more preferably, temperature: 105° C., time: 6 h.

In the preparation method, the molar ratio of the polyamine compound to the aziridine may be 1:(1-100); preferably is 1:(40-60); more preferably is 1:50.

In the preparation method, preferably, the polyamine compound is dissolved in absolute ethyl alcohol; and the aziridine is dissolved in ethanol. Since ethanol is a non-toxic organic solvent, preferably the polyamine compound and the aziridine are dissolved in ethanol in the preparation method to promote the reaction; in addition, the ethanol may be recycled, beneficial for green chemical synthesis.

In the drilling fluid according to the present invention, the intercalation inhibitor may be branched polyethylene imine; preferably, the degree of branching of the branched polyethylene imine may be 0.5-0.9, preferably is 0.6-0.8, more preferably is 0.75;

preferably, the weight-average molecular weight of the branched polyethylene imine may be 300-1,000, preferably is 500-700, more preferably is 600.

In the present invention, the inventor has prepared an intercalation inhibitor that has specific properties and strong inhibition performance, the adsorptive groups of the intercalation inhibitor (e.g., primary amine groups, secondary amine groups, tertiary amine groups, and quaternary amine groups have absorptivity) are intercalated in a form of a single spread layer between the grain layers of the clay minerals by virtue of adsorption, intercalation, and ion exchange effect, etc., and thereby the degree of surface hydration of clay is controlled effectively, and the inhibition performance of the drilling fluid system is greatly improved.

Besides, in the present invention, the branched polyethylene imine, which has a plurality of adsorptive groups, can be absorbed on the inner surfaces of the clay grain layers quickly, and thereby surface hydration of clay is inhibited completely. The branched polyethylene imine has little effect on the viscosity of the drilling fluid system, and can balance the contradiction between inhibition performance and rheological property of the drilling fluid.

Moreover, the branched polyethylene imine prepared in the present invention has no bio-toxicity, and can fully meet the design requirements for environmental protection of the drilling fluid.

In the drilling fluid according to the present invention, the pH of the drilling fluid may be 8-10.

In the drilling fluid according to the present invention, the density of the drilling fluid may be 1.2-1.4 g/cm$^3$.

In another aspect, the present invention provides a method for preparing a drilling fluid that inhibits surface hydration of clay, which comprises the following steps:
(1) prehydrating bentonite;
(2) mixing the prehydrated bentonite obtained in the step (1) with an intercalation inhibitor;
(3) mixing the mixture obtained in the step (2) with a tackifier, a flow pattern regulator, a filtrate reducer, a lubricant, and a weighting agent.

Hereunder the present invention will be detailed in examples.

Preparation Example 1

This preparation example is provided to describe the preparation method of the intercalation inhibitor in the present invention.
(1) 0.1 mol ethanol amine is dissolved in 100 ml organic solvent (ethanol), concentrated sulfuric acid is added by dropwise adding at 15 ml/min. dropwise adding rate at −40° C. temperature, the mixture is stirred at 1,200 rpm stirring speed for esterification reaction, and then the organic solvent is removed by atmospheric distillation, to obtain β-aminoethyl sulfate;
(2) 50 ml 30 mass % sodium hydroxide solution is added into the β-aminoethyl sulfate, the mixture is heated up till the β-aminoethyl sulfate is fully dissolved, and is kept at 100° C. for cyclization reaction; atmospheric distillation is executed after the cyclization reaction, a solid desiccant (sodium hydroxide) is added into the distillate for stratification, and the organic phase is collected to obtain aziridine;
(3) 1 mol polyamine compound (diethylene triamine) is dissolved in absolute ethyl alcohol, the mixture is heated up to 50° C., 100 mol ethanol solution of aziridine is added by dropwise adding into the mixture, and then the mixture is heated to have reflux reaction for 6 h, and reduced pressure distillation is executed after the reaction is completed to obtain branched polyethylene imine;

wherein, the degree of branching of the prepared branched polyethylene imine Z1 is 0.75;

and the weight-average molecular weight of the branched polyethylene imine is 650.

Preparation Example 2

(1) 0.1 mol ethanol amine is dissolved in 100 ml organic solvent (ethanol), concentrated sulfuric acid is added by dropwise adding at 15 ml/min. dropwise adding rate at 20° C. temperature, the mixture is stirred at 1,200 rpm stirring speed for esterification reaction, and then the organic solvent is removed by atmospheric distillation, to obtain β-aminoethyl sulfate;
(2) 50 ml 40 mass % sodium hydroxide solution is added into the β-aminoethyl sulfate, the mixture is heated up till the β-aminoethyl sulfate is fully dissolved, and is kept at 120° C. for cyclization reaction; atmospheric distillation is executed after the cyclization reaction, a solid desiccant (sodium hydroxide) is added into the distillate for stratification, and the organic phase is collected to obtain aziridine;
(3) 1 mol polyamine compound (diethylene triamine) is dissolved in absolute ethyl alcohol, the mixture is heated up to 60° C., 50 mol ethanol solution of aziridine is added by dropwise adding into the mixture, and then the mixture is heated to have reflux reaction for 12 h, and reduced pressure distillation is executed after the reaction is completed to obtain branched polyethylene imine;

wherein, the degree of branching of the prepared branched polyethylene imine Z2 is 0.65; and the weight-average molecular weight of the branched polyethylene imine is 600.

Preparation Example 3

An intercalation inhibitor is prepared with the method described in the preparation example 1, but the polyamine compound (diethylene triamine) is replaced with alkylamine (ethylene diamine);

wherein, the degree of branching of the prepared branched polyethylene imine Z3 is 0.5; and the weight-average molecular weight of the branched polyethylene imine is 500.

Example 1

This example is provided to describe the drilling fluid that can inhibit surface hydration of clay and the preparation method of the drilling fluid in the present invention.
(1) 100 parts by weight of tap water is mixed with 4 parts by weight Xinjiang Xiazijie bentonite at 25° C. temperature, and the mixture is stirred at 1,000 rpm stirring speed for 30 min., and then is kept still for 1 day.
(2) The mixture obtained in the step (1) is mixed with 1 g intercalation inhibitor prepared in the preparation example 1 at 25° C. temperature and the resultant mixture is stirred at 2,000 rpm stirring speed for 30 min.
(3) The mixture obtained in the step (2) is mixed with 5 g xanthan gum, 4 g chromium-free sulfonated lignite, 4 g sulfomethylated phenolic resin, 14 g graphite powder, and 52 g barite at 25° C. temperature, and the resultant mixture is stirred at 2,000 rpm stirring speed for 30 min.

Wherein, the pH of the drilling fluid is 9, and the density of the drilling fluid is 1.3 g/cm³.

Thus, a drilling fluid S1 that can inhibit surface hydration of clay as described in the present invention is obtained.

The data of rolling recovery rate of the drilling fluid is shown in Table 1;

The data of mud ball hydration rate of the drilling fluid is shown in Table 2.

Example 2

This example is provided to describe the drilling fluid that can inhibit surface hydration of clay and the preparation method of the drilling fluid in the present invention.
(1) 100 parts by weight of tap water is mixed with 5 parts by weight Xinjiang Xiazijie bentonite at 25° C. temperature, and the mixture is stirred at 1,000 rpm stirring speed for 30 min., and then is kept still for 1 day.
(2) The mixture obtained in the step (1) is mixed with 1.2 g intercalation inhibitor prepared in the preparation example 1 at 25° C. temperature and the resultant mixture is stirred at 2,000 rpm stirring speed for 30 min.
(3) The mixture obtained in the step (2) is mixed with 6 g xanthan gum, 5 g chromium-free sulfonated lignite, 5 g sulfomethylated phenolic resin, 1.6 g graphite powder, and 54 g barite at 25° C. temperature, and the resultant mixture is stirred at 2,000 rpm stirring speed for 30 min.

Wherein, the pH of the drilling fluid is 9, and the density of the drilling fluid is 1.3 g/cm³.

Thus, a drilling fluid S2 that can inhibit surface hydration of clay as described in the present invention is obtained.

The data of rolling recovery rate of the drilling fluid is shown in Table 1;

The data of mud ball hydration rate of the drilling fluid is shown in Table 2.

Example 3

This example is provided to describe the drilling fluid that can inhibit surface hydration of clay and the preparation method of the drilling fluid in the present invention.
(1) 100 parts by weight of tap water is mixed with 3 parts by weight Xinjiang Xiazijie bentonite at 25° C. temperature, and the mixture is stirred at 1,000 rpm stirring speed for 30 min., and then is kept still for 1 day.
(2) The mixture obtained in the step (1) is mixed with 0.8 g intercalation inhibitor prepared in the preparation example 1 at 25° C. temperature and the resultant mixture is stirred at 2,000 rpm stirring speed for 30 min.
(3) The mixture obtained in the step (2) is mixed with 4 g xanthan gum, 3 g chromium-free sulfonated lignite, 3 g sulfomethylated phenolic resin, 1.2 g graphite powder, and 50 g barite at 25° C. temperature, and the resultant mixture is stirred at 2,000 rpm stirring speed for 30 min.

Wherein, the pH of the drilling fluid is 9, and the density of the drilling fluid is 1.3 g/cm³.

Thus, a drilling fluid S3 that can inhibit surface hydration of clay as described in the present invention is obtained.

The data of rolling recovery rate of the drilling fluid is shown in Table 1;

The data of mud ball hydration rate of the drilling fluid is shown in Table 2.

Example 4

A drilling fluid is prepared with the method described in the example 1, but the intercalation inhibitor prepared in the preparation example 1 is replaced with the intercalation inhibitor prepared in the preparation example 2.

Wherein, the pH of the drilling fluid is 9, and the density of the drilling fluid is 1.3 g/cm³.

Thus, a drilling fluid S4 that can inhibit surface hydration of clay as described in the present invention is obtained.

The data of rolling recovery rate of the drilling fluid is shown in Table 1;

The data of mud ball hydration rate of the drilling fluid is shown in Table 2.

Example 5

A drilling fluid is prepared with the method described in the example 2, but the intercalation inhibitor prepared in the preparation example 1 is replaced with the intercalation inhibitor prepared in the preparation example 2.

Wherein, the pH of the drilling fluid is 9, and the density of the drilling fluid is 1.3 g/cm³.

Thus, a drilling fluid S5 that can inhibit surface hydration of clay as described in the present invention is obtained.

The data of rolling recovery rate of the drilling fluid is shown in Table 1;

The data of mud ball hydration rate of the drilling fluid is shown in Table 2.

Example 6

A drilling fluid is prepared with the method described in the example 3, but the intercalation inhibitor prepared in the preparation example 1 is replaced with the intercalation inhibitor prepared in the preparation example 2.

Wherein, the pH of the drilling fluid is 9, and the density of the drilling fluid is 1.3 g/cm³.

Thus, a drilling fluid S6 that can inhibit surface hydration of clay as described in the present invention is obtained.

The data of rolling recovery rate of the drilling fluid is shown in Table 1;

The data of mud ball hydration rate of the drilling fluid is shown in Table 2.

Example 7

A drilling fluid is prepared with the method described in the example 1, but the intercalation inhibitor prepared in the preparation example 1 is replaced with the intercalation inhibitor prepared in the preparation example 3.

Wherein, the pH of the drilling fluid is 9, and the density of the drilling fluid is 1.3 g/cm³.

Thus, a drilling fluid S7 that can inhibit surface hydration of clay as described in the present invention is obtained.

The data of rolling recovery rate of the drilling fluid is shown in Table 1;

The data of mud ball hydration rate of the drilling fluid is shown in Table 2.

Example 8

A drilling fluid is prepared with the method described in the example 2, but the intercalation inhibitor prepared in the preparation example 1 is replaced with the intercalation inhibitor prepared in the preparation example 3.

Wherein, the pH of the drilling fluid is 9, and the density of the drilling fluid is 1.3 g/cm³.

Thus, a drilling fluid S8 that can inhibit surface hydration of clay as described in the present invention is obtained.

The data of rolling recovery rate of the drilling fluid is shown in Table 1;
The data of mud ball hydration rate of the drilling fluid is shown in Table 2.

Example 9

A drilling fluid is prepared with the method described in the example 3, but the intercalation inhibitor prepared in the preparation example 1 is replaced with the intercalation inhibitor prepared in the preparation example 3.

Wherein, the pH of the drilling fluid is 9, and the density of the drilling fluid is 1.3 g/cm$^3$.

Thus, a drilling fluid S9 that can inhibit surface hydration of clay as described in the present invention is obtained.

The data of rolling recovery rate of the drilling fluid is shown in Table 1;
The data of mud ball hydration rate of the drilling fluid is shown in Table 2.

Example 10

A drilling fluid is prepared with the method described in the example 3, but the mixture obtained in the step (2) is mixed with 0.9 g xanthan gum, 0.5 g chromium-free sulfonated lignite, 0.9 g sulfomethylated phenolic resin, 0.4 g graphite powder, and 11 g barite at 25° C. temperature, and the resultant mixture is stirred at 2,000 rpm stirring speed for 30 min.

Wherein, the pH of the drilling fluid is 6, and the density of the drilling fluid is 1.3 g/cm$^3$.

Thus, a drilling fluid S10 that can inhibit surface hydration of clay as described in the present invention is obtained.

The data of rolling recovery rate of the drilling fluid is shown in Table 1;
The data of mud ball hydration rate of the drilling fluid is shown in Table 2.

Example 11

A drilling fluid is prepared with the method described in the example 3, but the mixture obtained in the step (2) is mixed with 11 g xanthan gum, 8 g chromium-free sulfonated lignite, 9 g sulfomethylated phenolic resin, 5 g graphite powder, and 65 g barite at 25° C. temperature, and the resultant mixture is stirred at 2,000 rpm stirring speed for 30 min.

Wherein, the pH of the drilling fluid is 11, and the density of the drilling fluid is 1.3 g/cm$^3$.

Thus, a drilling fluid S11 that can inhibit surface hydration of clay as described in the present invention is obtained.

The data of rolling recovery rate of the drilling fluid is shown in Table 1;
The data of mud ball hydration rate of the drilling fluid is shown in Table 2.

Example 12

A drilling fluid is prepared with the method described in the example 1, but hydrated bentonite, intercalation inhibitor, xanthan gum, chromium-free sulfonated lignite, sulfomethylated phenolic resin, graphite powder and barite are stirred together at 25° C. temperature at 2,000 rpm stirring speed for 30 min.; that is to say, the scheme of mixing the intercalation inhibitor with hydrated bentonite first and then mixing the resultant mixture with xanthan gum, chromium-free sulfonated lignite, sulfomethylated phenolic resin, graphite powder and barite is not used.

Wherein, the pH of the drilling fluid is 9, and the density of the drilling fluid is 1.3 g/cm$^3$.

Thus, a drilling fluid S12 that can inhibit surface hydration of clay as described in the present invention is obtained.

The data of rolling recovery rate of the drilling fluid is shown in Table 1;
The data of mud ball hydration rate of the drilling fluid is shown in Table 2.

Comparative Example 1

A drilling fluid is prepared with the method described in the example 1, but 0.1 g intercalation inhibitor is added.

Wherein, the pH of the drilling fluid is 9, and the density of the drilling fluid is 1.3 g/cm$^3$.

Thus, a drilling fluid D1 that can inhibit surface hydration of clay is obtained.

The data of rolling recovery rate of the drilling fluid is shown in Table 1;
The data of mud ball hydration rate of the drilling fluid is shown in Table 2.

Comparative Example 2

A drilling fluid is prepared with the method described in the example 1, but 3 g intercalation inhibitor is added.

Wherein, the pH of the drilling fluid is 9, and the density of the drilling fluid is 1.3 g/cm$^3$.

Thus, a drilling fluid D2 that can inhibit surface hydration of clay is obtained.

The data of rolling recovery rate of the drilling fluid is shown in Table 1;
The data of mud ball hydration rate of the drilling fluid is shown in Table 2.

Comparative Example 3

A drilling fluid is prepared with the method described in the example 1, but the intercalation inhibitor is replaced with potassium chloride, which is an inhibitor commonly used in drilling fluids; the dose of the potassium chloride is 1 g, the same as the dose of the intercalation inhibitor in the example 1.

Wherein, the pH of the drilling fluid is 9, and the density of the drilling fluid is 1.3 g/cm$^3$.

Thus, a drilling fluid D3 that can inhibit surface hydration of clay is obtained.

The data of rolling recovery rate of the drilling fluid is shown in Table 1;
The data of mud ball hydration rate of the drilling fluid is shown in Table 2.

Comparative Example 4

A drilling fluid is prepared with the method described in the example 1, but the intercalation inhibitor is replaced with potassium chloride, which is an inhibitor commonly used in drilling fluids, and the dose of the potassium chloride is 10 g.

Wherein, the pH of the drilling fluid is 9, and the density of the drilling fluid is 1.3 g/cm$^3$.

Thus, a drilling fluid D4 that can inhibit surface hydration of clay is obtained.

The data of rolling recovery rate of the drilling fluid is shown in Table 1;

The data of mud ball hydration rate of the drilling fluid is shown in Table 2.

Comparative Example 5

A drilling fluid is prepared with the method described in the example 1, but no intercalation inhibitor is added.

Wherein, the pH of the drilling fluid is 9, and the density of the drilling fluid is 1.3 g/cm³.

Thus, a drilling fluid D5 that can inhibit surface hydration of clay is obtained.

The data of rolling recovery rate of the drilling fluid is shown in Table 1;

The data of mud ball hydration rate of the drilling fluid is shown in Table 2.

Comparative Example 6

A drilling fluid is prepared with the method described in the example 4, but 0.1 g intercalation inhibitor is added.

Wherein, the pH of the drilling fluid is 9, and the density of the drilling fluid is 1.3 g/cm³.

Thus, a drilling fluid D6 that can inhibit surface hydration of clay is obtained.

The data of rolling recovery rate of the drilling fluid is shown in Table 1;

The data of mud ball hydration rate of the drilling fluid is shown in Table 2.

Comparative Example 7

A drilling fluid is prepared with the method described in the example 7, but 0.1 g intercalation inhibitor is added.

Wherein, the pH of the drilling fluid is 9, and the density of the drilling fluid is 1.3 g/cm³.

Thus, a drilling fluid D7 that can inhibit surface hydration of clay is obtained.

The data of rolling recovery rate of the drilling fluid is shown in Table 1;

The data of mud ball hydration rate of the drilling fluid is shown in Table 2.

Test Example 1

50 g 6-10 mesh rock cuttings is loaded into an aging reactor, and then 300 ml drilling fluids obtained in the examples 1-12 and the comparative examples 1-7 are injected into the aging reactor respectively; the aging reactor is sealed, placed in a hot rolling furnace and held at 200° C. temperature for 24 h for reaction, and then the aging reactor is taken out, the mixture in the aging reactor is filtered, washed, dried, and weighed, to obtain rolling recovery rate of the drilling fluids. The results are shown in Table 1.

TABLE 1

| Drilling Fluid | Rolling Recovery Rate |
| --- | --- |
| S1 | 98.8% |
| S2 | 97.4% |
| S3 | 98% |
| S4 | 97% |
| S5 | 97.3% |
| S6 | 97.8% |
| S7 | 96.8% |
| S8 | 96.6% |
| S9 | 96.1% |
| S10 | 94.1% |
| S11 | 92.4% |

TABLE 1-continued

| Drilling Fluid | Rolling Recovery Rate |
| --- | --- |
| S12 | 93.8% |
| D1 | 61.5% |
| D2 | 78% |
| D3 | 52.1% |
| D4 | 91.4% |
| D5 | 77% |
| D6 | 61% |
| D7 | 65% |

Test Example 2

Round mud balls in 50 g weight are prepared from bentonite and water, the mud balls are dried at 40° C. temperature, and then are immersed in 300 ml drilling fluids obtained in the examples 1-12 and comparative examples 1-7 respectively at room temperature for 24 h; then, the mud balls are taken out, the foamy soil on the surfaces of the mud balls is removed, and the mud balls are dried at 40° C. temperature and weighed, to obtain mud ball hydration rates of the drilling fluids. The results are shown in Table 2.

TABLE 2

| Drilling Fluid | Mud Ball Hydration Rate |
| --- | --- |
| S1 | 3.2% |
| S2 | 3.5% |
| S3 | 3.1% |
| S4 | 4.4% |
| S5 | 4.8% |
| S6 | 4.2% |
| S7 | 5.8% |
| S8 | 5.4% |
| S9 | 5.5% |
| S10 | 7.2% |
| S11 | 6.8% |
| S12 | 7.4% |
| D1 | 78.5% |
| D2 | 15% |
| D3 | 87.8% |
| D4 | 24.2% |
| D5 | 54.5% |
| D6 | 64.4% |
| D7 | 38.5% |

It is seen from the evaluation result of rolling recovery rates in the Table 1 and the mud ball hydration rates in the Table 2:

The branched polyethylene imine Z1 prepared in the preparation example 1 is used in the examples 1-3. As a result, the recovery rates in the examples 1-3 are 97% or higher, and the mud ball hydration rates are lower than 4%, which indicate high inhibition performance.

The branched polyethylene imine Z2 prepared in the preparation example 2 is used in the examples 4-6. As a result, the recovery rates in the examples 4-6 are 97% or higher, and the mud ball hydration rates are lower than 5%, which indicate high inhibition performance.

The branched polyethylene imine Z3 prepared in the preparation example 3 is used in the examples 7-9. As a result, the recovery rates in the examples 7-9 are 96% or higher, and the mud ball hydration rates are lower than 6%, which indicate high inhibition performance.

The contents of the components in the examples 10 and 11 are not within the specific ranges defined in the present invention; as a result, the recovery rates are 92.4-94.1%, the mud ball hydration rates are 6.8-7.2%. The results indicate slightly inferior inhibition performance, and also demonstrate that high inhibition performance can be obtained only if the contents of the components in the drilling fluid are within the specific ranges defined in the present invention, which are determined by the inventor of the present invention through a large number of scientific experiments.

In the example 12, hydrated bentonite, intercalation inhibitor, xanthan gum, chromium-free sulfonated lignite, sulfomethylated phenolic resin, graphite powder and barite are mixed together with hydrated bentonite first; as a result, the yield ratio is 93.8%, the mud ball hydration rate is 7.4%. The result indicates slightly inferior inhibition performance, and demonstrates that the scheme of mixing hydrated bentonite with the intercalation inhibitor first and then mixing the resultant mixture with xanthan gum, chromium-free sulfonated lignite, sulfomethylated phenolic resin, graphite powder and barite, which is obtained by the inventor of the present invention through a large number of scientific experiments, for preparation of the drilling fluid, can attain a good inhibition effect.

In the comparative example 1, the inhibition performance of the drilling fluid D1 is obviously degraded, because the dose of the intercalation inhibitor is decreased.

In the comparative example 2, the inhibition performance of the drilling fluid D2 is slightly degraded, because excessive intercalation inhibitor is added.

In the comparative example 3, the intercalation inhibitor is replaced with potassium chloride, and the dose remains unchanged; as a result, the inhibition performance of the drilling fluid D3 is severely degraded. That indicates that the inhibition effect of intercalation inhibitor is superior to that of potassium chloride.

In the comparative example 4, though the dose of potassium chloride is increased, the inhibition effect of the drilling fluid D4 is still inferior to that of the drilling fluid in which the intercalation inhibitor is added.

In the comparative example 5, no intercalation inhibitor is added; as a result, the inhibition performance of the drilling fluid D5 is severely degraded. That indicates the intercalation inhibitor takes a very important role.

In the comparative example 6, the intercalation inhibitor is the branched polyethylene imine Z2 prepared in the preparation example 2. The inhibition performance of the drilling fluid D6 is obviously degraded because the dose of the intercalation inhibitor is decreased.

In the comparative example 7, the intercalation inhibitor is the branched polyethylene imine Z3 prepared in the preparation example 3. The inhibition performance of the drilling fluid D7 is obviously degraded because the dose of the intercalation inhibitor is decreased.

Therefore, the intercalation inhibitor can effectively control the degree of surface hydration of clay and thereby greatly improve the inhibition performance of the drilling fluid system when it is intercalated in a form of a single spread layer between grain layers of clay minerals; in addition, the prepared drilling fluid has high inhibition performance under specific conditions of preparation, if the contents of the intercalation inhibitor and other components are within specific content ranges.

While the present invention is described above in detail in some preferred embodiments, the present invention is not limited to those embodiments. Different simple variations can be made to the technical scheme of the present invention within the scope of the technical concept of the present invention, including combining the specific technical features in any proper way. Various possible combinations are not described in the present invention, in order to avoid unnecessary repetitive description. However, such simple variations and combinations shall also be deemed as having been disclosed and falling in the scope of protection of the present invention.

The invention claimed is:

1. A drilling fluid for inhibiting surface hydration of clay, wherein, the drilling fluid consists of:
   water,
   bentonite,
   an intercalation inhibitor,
   a tackifier,
   a flow pattern regulator,
   a filtrate reducer,
   a lubricant, and
   a weighting agent,
   wherein, based on 100 parts by weight of water, the content of the bentonite is 2-9 parts by weight, the content of the intercalation inhibitor is 0.3-4 parts by weight, the content of the tackifier is 1-10 parts by weight, the content of the flow pattern regulator is 0.8-7 parts by weight, the content of the filtrate reducer is 1-8 parts by weight, the content of the lubricant is 0.5-4 parts by weight, and the content of the weighting agent is 12-60 parts by weight,
   wherein the intercalation inhibitor is branched polyethylene imine having a degree of branching of 0.5-0.9 and a weight-average molecular weight of 300-1,000.

2. The drilling fluid according to claim 1, wherein, based on 100 parts by weight of water, the content of the bentonite is 3-5 parts by weight, the content of the intercalation inhibitor is 0.8-1.2 parts by weight, the content of the tackifier is 4-6 parts by weight, the content of the flow pattern regulator is 3-5 parts by weight, the content of the filtrate reducer is 3-5 parts by weight, the content of the lubricant is 1.2-1.6 parts by weight, and the content of the weighting agent is 50-54 parts by weight.

3. The drilling fluid according to claim 1, wherein the weighting agent is barite.

4. The drilling fluid according to claim 1, wherein the tackifier is xanthan gum;
   the flow pattern regulator is chromium-free sulfonated lignite;
   the filtrate reducer is sulfomethylated phenolic resin;
   the lubricant is graphite powder.

5. The drilling fluid according to claim 1, wherein the pH of the drilling fluid is 8-10.

6. The drilling fluid according to claim 1, wherein the density of the drilling fluid is 1.2-1.4 g/cm$^3$.

* * * * *